US012118975B2

(12) United States Patent
Griffin et al.

(10) Patent No.: US 12,118,975 B2
(45) Date of Patent: Oct. 15, 2024

(54) FEEDFORWARD CONTROL OF AN ENCLOSED SPACE WITH MULTIPLE INCOHERENT EXCITATIONS

(71) Applicant: The Boeing Company, Chicago, IL (US)

(72) Inventors: Steven Griffin, Kihei, HI (US); Joshua Martin Montgomery, Seattle, WA (US)

(73) Assignee: The Boeing Company, Chicago, IL (US)

( * ) Notice: Subject to any disclaimer, the term of this patent is extended or adjusted under 35 U.S.C. 154(b) by 213 days.

(21) Appl. No.: 17/814,284

(22) Filed: Jul. 22, 2022

(65) Prior Publication Data

US 2023/0052886 A1 Feb. 16, 2023

Related U.S. Application Data

(60) Provisional application No. 63/260,297, filed on Aug. 16, 2021.

(51) Int. Cl.

| | |
|---|---|
| ***G10K 11/178*** | (2006.01) |
| ***H04R 1/40*** | (2006.01) |
| ***H04R 3/00*** | (2006.01) |
| ***H04R 19/01*** | (2006.01) |

(52) U.S. Cl.

CPC .. *G10K 11/17857* (2018.01); *G10K 11/17823* (2018.01); *G10K 11/17825* (2018.01); *G10K 11/17881* (2018.01); *H04R 1/406* (2013.01); *H04R 3/005* (2013.01); *H04R 19/016* (2013.01); *G10K 2210/3012* (2013.01); *G10K 2210/3026* (2013.01); *G10K 2210/3027* (2013.01); *G10K 2210/3035* (2013.01); *G10K 2210/30351* (2013.01); *G10K 2210/3047* (2013.01); *G10K 2210/501* (2013.01)

(58) Field of Classification Search

CPC ................. G10K 11/17857; G10K 2210/1281

See application file for complete search history.

(56) References Cited

U.S. PATENT DOCUMENTS

2014/0169579 A1* 6/2014 Azmi .................. H04R 1/1083 381/71.6
2018/0075835 A1* 3/2018 Hatakeyama .... G10K 11/17857
2022/0277725 A1* 9/2022 Tani ................ G10K 11/17881

* cited by examiner

*Primary Examiner* — Ping Lee
(74) *Attorney, Agent, or Firm* — Yee & Associates, P.C.

(57) ABSTRACT

A method for feedforward noise cancellation in an enclosed space within a structure is provided. The method comprises placing a microphone array inside an inner surface of the enclosed space and conducting modal testing on an outside surface of the enclosed space, wherein the modal testing comprises multiple incoherent noise sources corresponding to locations of microphones in the microphone array. Noise generated by the modal testing is processed to create a number of acoustic mathematical models of the enclosed space. In response to incoherent noise within the enclosed space, a noise canceling signal is generated according to an output of the mathematical models.

20 Claims, 13 Drawing Sheets

FEEDFORWARD CONTROL OF AN ENCLOSED SPACE WITH MULTIPLE INCOHERENT EXCITATIONS

CROSS-REFERENCE TO RELATED APPLICATION

This application claims the benefit of U.S. Provisional patent application Ser. No. 63/260,297, filed Aug. 16, 2021, and entitled "Feedforward Control of an Enclosed Space with Multiple Incoherent Excitations," which is incorporated herein by reference in its entirety.

BACKGROUND INFORMATION

1. Field

The present disclosure relates generally to noise cancellation, and more specifically, to a method for feedforward active noise cancellation on a jet aircraft.

2. Background

Adaptive noise cancelling using feedforward control has found many applications in the consumer market. The most popular application is the active, noise reducing headphone. In headphones, noise cancellation works by creating a cancelling sound at the user's ear by sampling the sound at some distance from the ear (usually directly outside the headphones) and generating the opposite sound to what is expected to transmit to the ear based on the outside measurement as shown in FIG. 1. Adaptation is required because the nature of the transmission path to the ear can change over time and adapting to those changes keeps the sound at the ear minimized.

In problems where cancellation is desired in a larger space but also commercially available, like a jet aircraft, the sound transmission path is much more complicated.

Therefore, it would be desirable to have a method and apparatus that take into account at least some of the issues discussed above, as well as other possible issues.

SUMMARY

The illustrative embodiments provide a method for feedforward noise cancellation in an enclosed space within a structure. The method comprises placing a microphone array inside an inner surface of the enclosed space and conducting modal testing on an outside surface of the enclosed space, wherein the modal testing comprises multiple incoherent noise sources corresponding to locations of microphones in the microphone array. Noise generated by the modal testing is processed to create a number of acoustic mathematical models of the enclosed space. In response to incoherent noise within the enclosed space, a noise canceling signal is generated according to an output of the mathematical models.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that where noise cancellation is desired in a large commercially available space, e.g., a turboprop aircraft, the sound transmission path is much more complicated than smaller spaces such as noise cancelling headphones. Noise is generated by the aircraft propeller blade passage frequency and its harmonics. Therefore, the reference is known. However, the paths between the propeller input and the passenger's ear are much more complicated.

The illustrative embodiments also recognize and take into account that cancellation can only be formulated at a given microphone, using one or more speakers inside the aircraft. Cancellation at one microphone is no guarantee that overall noise in the cabin is reduced. To achieve reduction in a large cabin or similar space, multiple speakers and microphones are required, and reduction at higher harmonics of the propeller require even more speakers and microphones.

The illustrative embodiments also recognize and take into account that adaptation is also necessary. For example, whenever a passenger moves in the cabin, or equipment is moved in the cabin, or the blade passage frequency is changed, the right answer for noise cancellation also changes.

Figure 1:
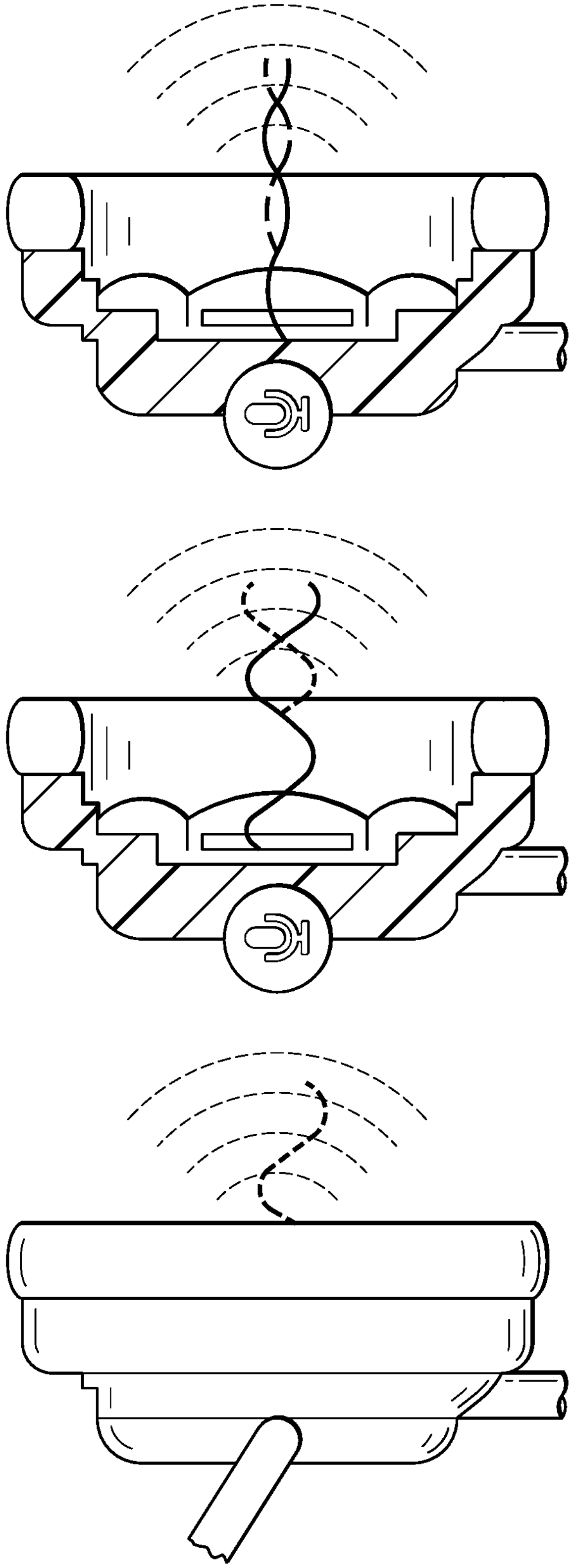
FIG. 1 (PRIOR ART)
FIG. 1 is an illustration of a noise cancelling headphone in accordance with the prior art.
Figure 2:
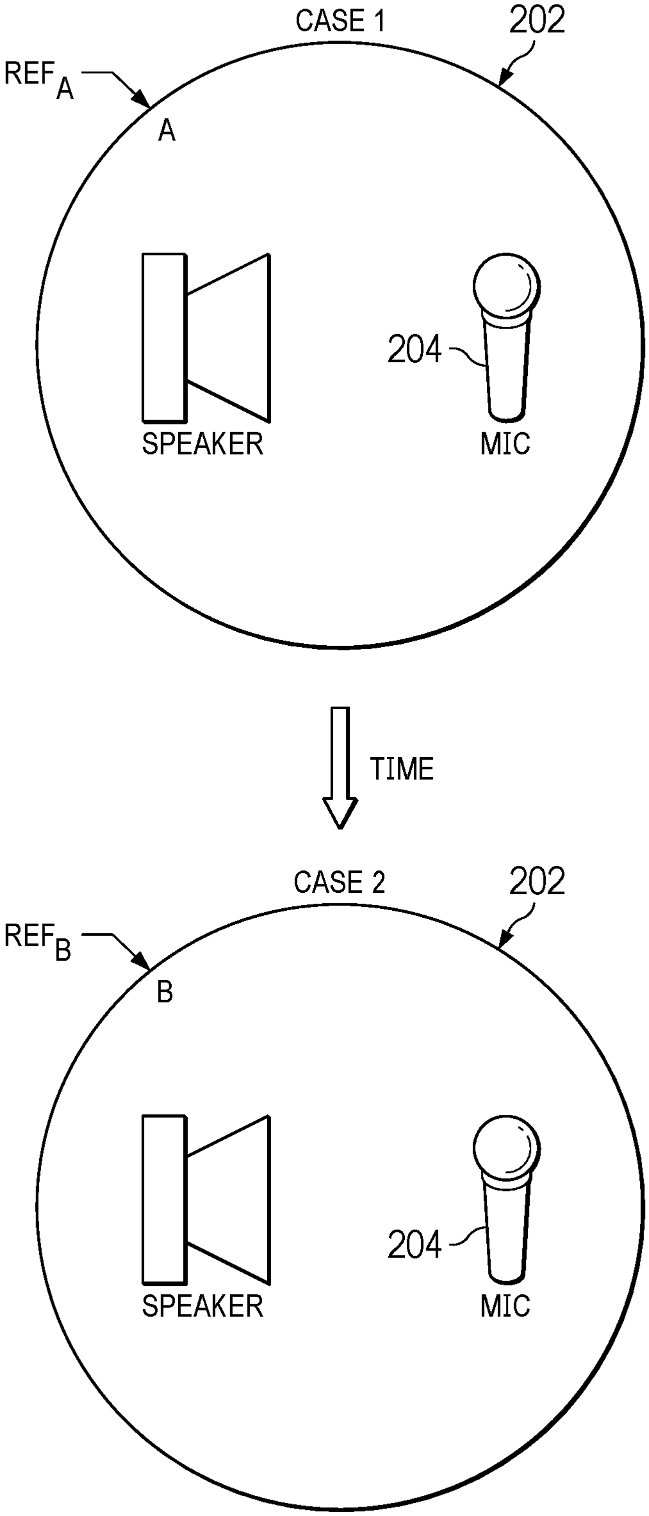
FIG. 2 illustrates an enclosed space in which the canceling relationship between a reference microphone and error microphone changes over time.

The illustrative embodiments also recognize and take into account that situations where adaptive noise cancellation has not been successful are those with multiple, incoherent sources, like jet aircraft. These situations differ from headphones because the canceling relationship between the reference microphone 202 and the error microphone 204 placed close to the ear is rapidly changing with every time step, as shown in FIG. 2. In contrast, by covering the ear with a passive hood in the headphone, the acoustic transmission loses its dependence on where the sound disturbance is coming from.

A microphone placed at a similar distance from the ear in a jet might work as long as the disturbance direction does not change. However, the nature of multiple, incoherent sources is such that the disturbance direction is constantly changing. The turboprop, on the other hand, works in a space as large as that of a jet aircraft, but the disturbance is very stable since the majority of it is caused by rotors that provide a very slowly changing, periodic input.

The illustrative embodiments provide a method of combining the advantages of active noise cancelling headphones and the turboprop implementations by making use of additional information about the structural acoustic problem. This information is gleaned from a system identification step that employs an array of microphones along the interior of an enclosure as well as the measurement of the frequency response of each of the microphones in response to an out-of-plane excitation at each microphone location. This characterization step allows real-time calculation of the source distribution at every time step, thus enabling cancellation at the ear of the inhabitant of the enclosed space. In addition, the distributed nature of the microphone array and the pursuit of a simplified sound field can be aided by a unique additive manufacturing process.

Figure 3:
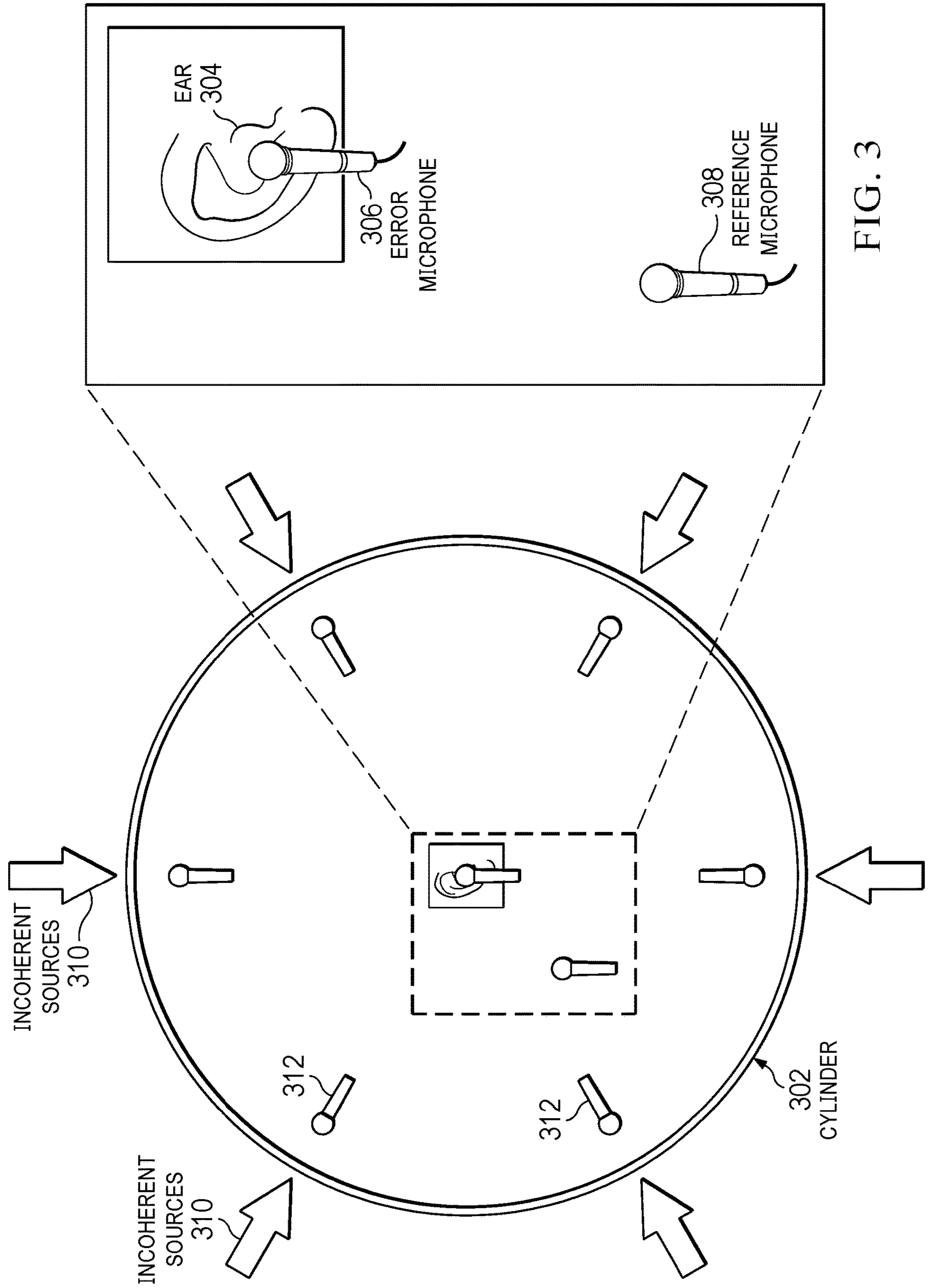
FIG. 3 illustrates a longitudinal cross-section view of an enclosed space with multiple, incoherent noise sources in accordance with an illustrative embodiment.
Figure 4:
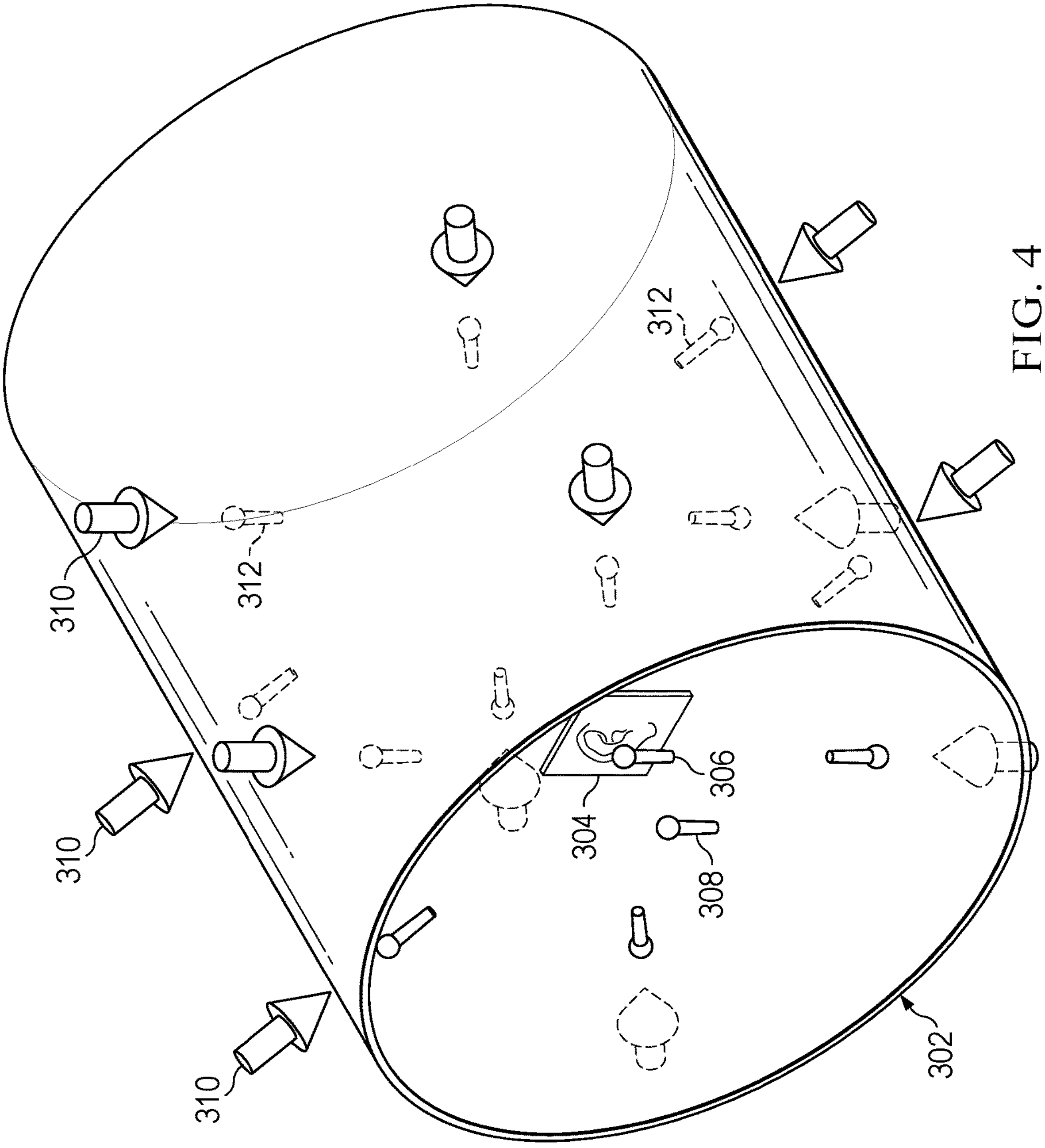
FIG. 4 illustrates a perspective view of an enclosed space with multiple, incoherent noise sources in accordance with an illustrative embodiment.
Figure 5:
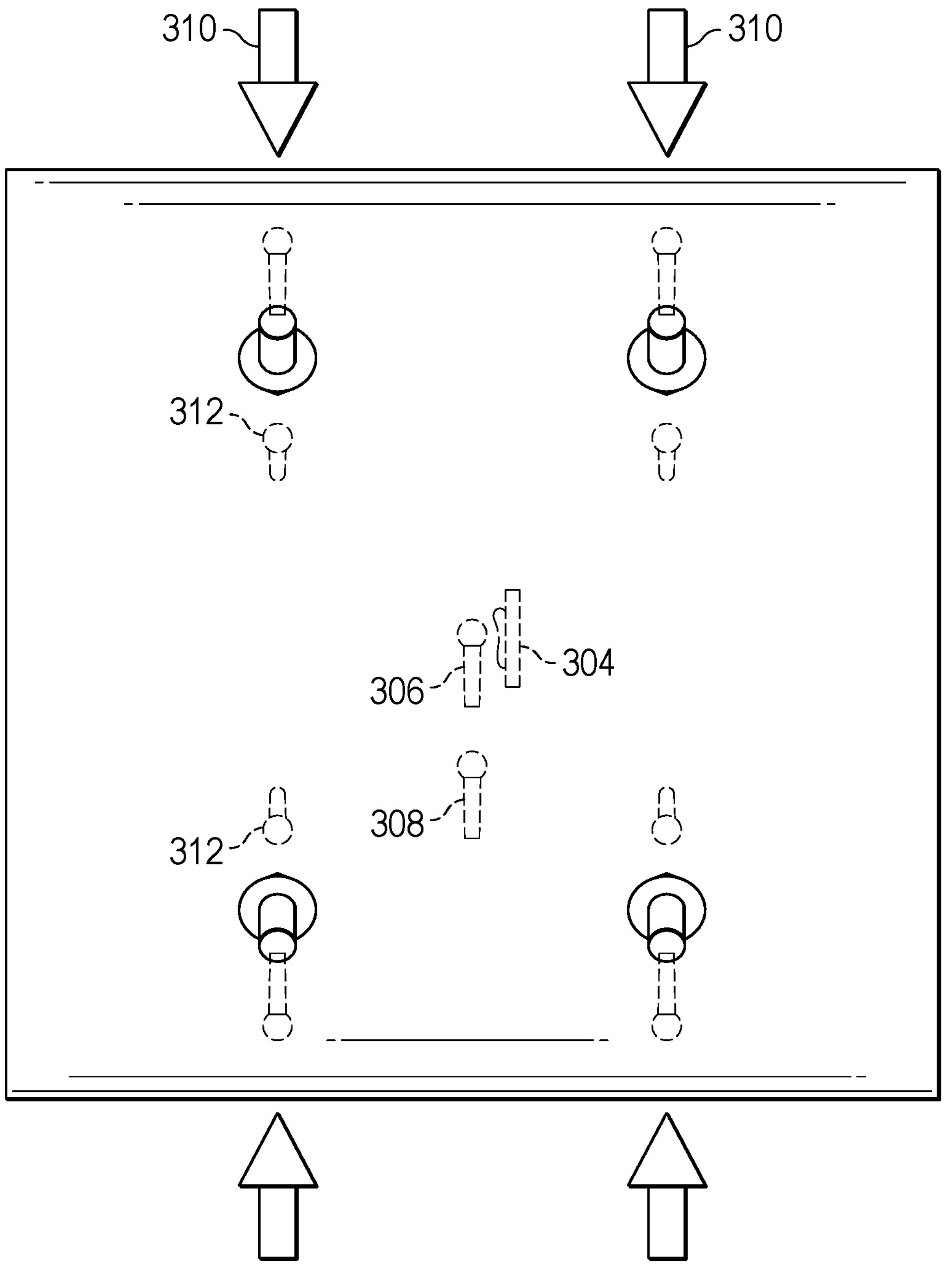
FIG. 5 illustrates a side view of an enclosed space with multiple, incoherent noise sources in accordance with an illustrative embodiment.

A simplified example of sound propagation into an enclosed space with multiple, incoherent sources is shown in FIGS. 3, 4, and 5. FIG. 3 illustrates a longitudinal cross-section view of an enclosed space with multiple, incoherent noise sources in accordance with an illustrative embodiment. FIG. 4 illustrates a perspective view of an enclosed space with multiple, incoherent noise sources in accordance with an illustrative embodiment. FIG. 5 illustrates a side view of an enclosed space with multiple, incoherent noise sources in accordance with an illustrative embodiment.

In the illustrated examples, a green, polycarbonate, transparent cylinder 302 surrounds an ear 304 (representing a passenger) at its center. The microphone 306 coincident with the ear 304 is the error microphone and the next closest microphone 308 is the reference microphone. This hardware configuration is common to every feedforward control system. In practice, there might be multiple reference and error microphones. The control speaker that would generate a cancelling field is not shown in the figures, but it can be assumed to be closer to the ear 304 than the reference microphone 308. There may be multiple control speakers. It is assumed that the end caps of the cylinder 302 are completely transparent and completely rigid, allowing observation on the inside of the cylinder but not allowing any sound transmission. The only means of sound transmission or generation is via the flexible, polycarbonate cylinder 302.

What distinguish FIGS. 3-5 from a standard feedforward problem are the external arrows 310 which may be considered as incoherent sources applied outside the cylinder 302. In practice, incoherent sources 310 may be due to applied forces or applied sound pressure over a local area. In addition, microphones 312 are located coincident with each applied force input 310.

Figure 6:
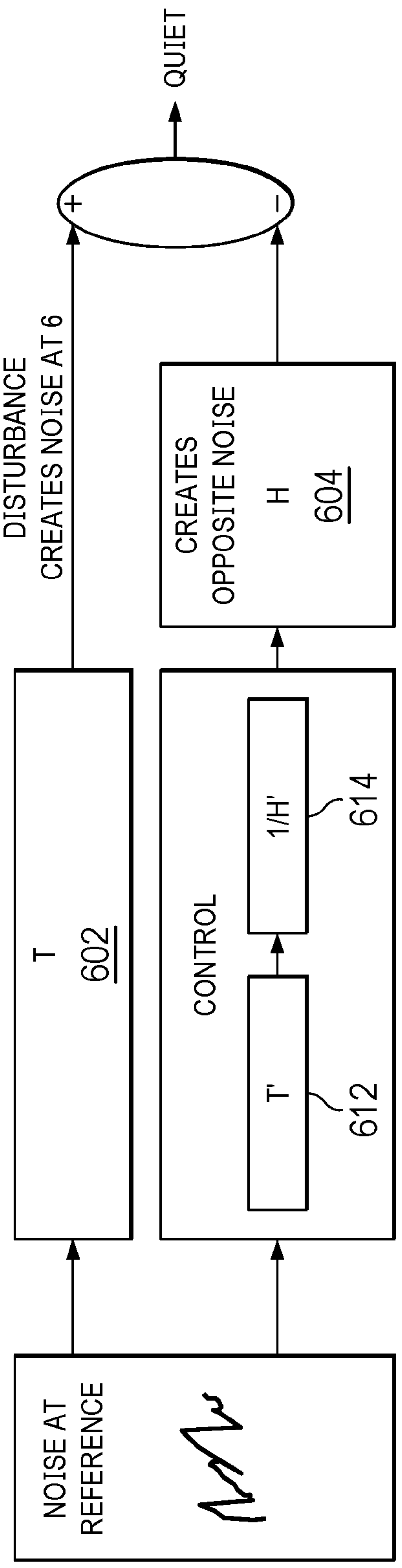
FIG. 6 illustrates noise cancelling relationships if noise inputs are coherent and unchanging.

FIG. 6 illustrates noise cancelling relationships if noise inputs are coherent and unchanging. FIG. 6 represents a situation wherein there is only one input in FIGS. 3-5 (instead of 12) or if all of the inputs were coherently related to each other and unchanging. In such a situation one could measure the transmissibility, T, between the reference microphone 308 and the error microphone 306, and the transfer function, H, between the control speaker and the error sensor.

T' and H' are mathematical models of T and H that are measured ahead of time to be used in the controller. The physical paths are represented by blocks 602 and 604, whereas blocks 612 and 614 represent the math necessary to implement noise cancellation. If the noise is periodic, very good noise cancellation can be achieved because the answer can be delayed by several cycles and still cancel effectively. However, if the noise is changing, the cancellation signal has to get to the error microphone before the disturbance does. This causal limitation creates a limit on the wavelength of the sound that can be corrected. This limit is sometimes referred to as the bandwidth of the feedforward controller.

In the case of multiple, incoherent inputs, T can be viewed as constantly changing. Therefore, a math model for T cannot be used because it is not valid for the time necessary to implement noise cancellation. In practice, a math model derived for a distribution of sources at one time step could easily increase the sound at the error microphone during the next time step due to the rapidly changing source distribution.

The addition of a step to measure the relationship between the array of microphones on the immediate interior of the cylinder and each of the coincident force inputs will generate a fully coupled, multi-input, multi-output (MIMO) transfer function matrix. In the case of the example system shown in FIGS. 3-5, the dimensions of this MIMO model will be 12 inputs by 12 outputs. In practice, this MIMO transfer function matrix can be measured with an out-of-plane excitation like a modal hammer, and the response at each of the microphones would also be measured. Additional structural sensors like accelerometers or piezoceramic patches or wafers may also be used to measure additional information, but the minimum sensor set would comprise a microphone at each excitation point.

Instead of (or in addition to) generating sound through modal testing (hammer) on the outside of the skin and detecting the resulting noise with error microphone 306, the process can be inverted. In this alternate testing configuration, an omnidirectional speaker is placed in the location of error speaker 306, and respective accelerometers or piezoelectric sensors are placed on the outer or inner wall of the skin at modal testing locations 310. This configuration generates sound at the point of desired cancelation and detects it along the wall with collocated accelerations produced at the various modal testing locations.

A math model can then be fit to the measured data and inverted to predict a force distribution at each time step that might result in the measured pressure distribution. In addition, the transmissibility, $T_i$, that results from an input at each force input, i, is also measured and fit with a math model. Given this information about the system, a feedforward controller can use the predicted force distribution to formulate the correct transmissibility and cancel noise at the error microphone.

Figure 7:
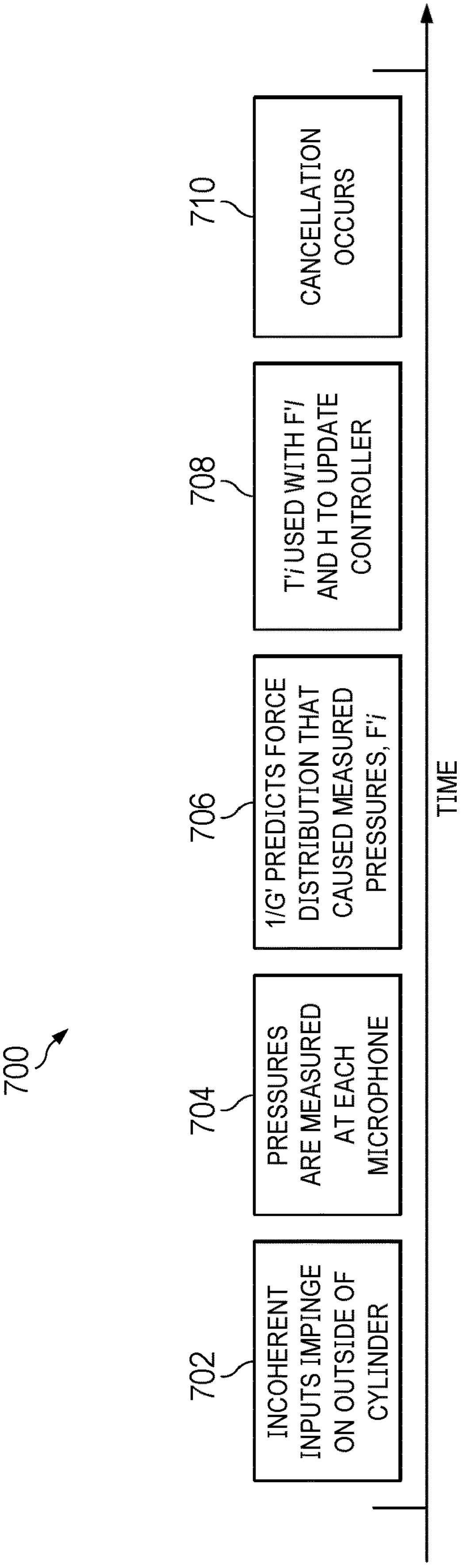
FIG. 7 illustrates the operations necessary during a given time step to implement cancellation of incoherent noise inputs in accordance with an illustrative embodiment.

FIG. 7 illustrates the operations necessary during a given time step to implement cancellation of incoherent noise inputs in accordance with an illustrative embodiment. FIG. 7 assumes the MIMO transfer function matrix, G, has been measured in advance and fit with a math model, G'. FIG. 7 also assumes a math model, $T'_I$, has been fit to the measured transmissibilities, $T_i$. A model of the transfer function, H', between the control actuator and the error sensor is also assumed to have been measured and fit.

At the start of time step 700, incoherent inputs impinge on the outside of the cylinder (operation 702), and pressures are measured at each microphone (operation 704). 1/G' predicts the force distribution that causes measured pressures, $F'_i$ (operation 706). T'i is then used with F'I and H to update the controller (operation 708). Finally, noise cancellation occurs according to the above calculations (operation 710).

By instrumenting the interior of the cylinder of the array with microphones and measuring the relationship between microphones and the locations of the incoherent inputs in advance, this approach outlines a way of predicting the force distribution in time to update the feedforward controller. In addition, the implementation benefits from an adaptive loop to account for gradual changes in the math models.

Figure 8:
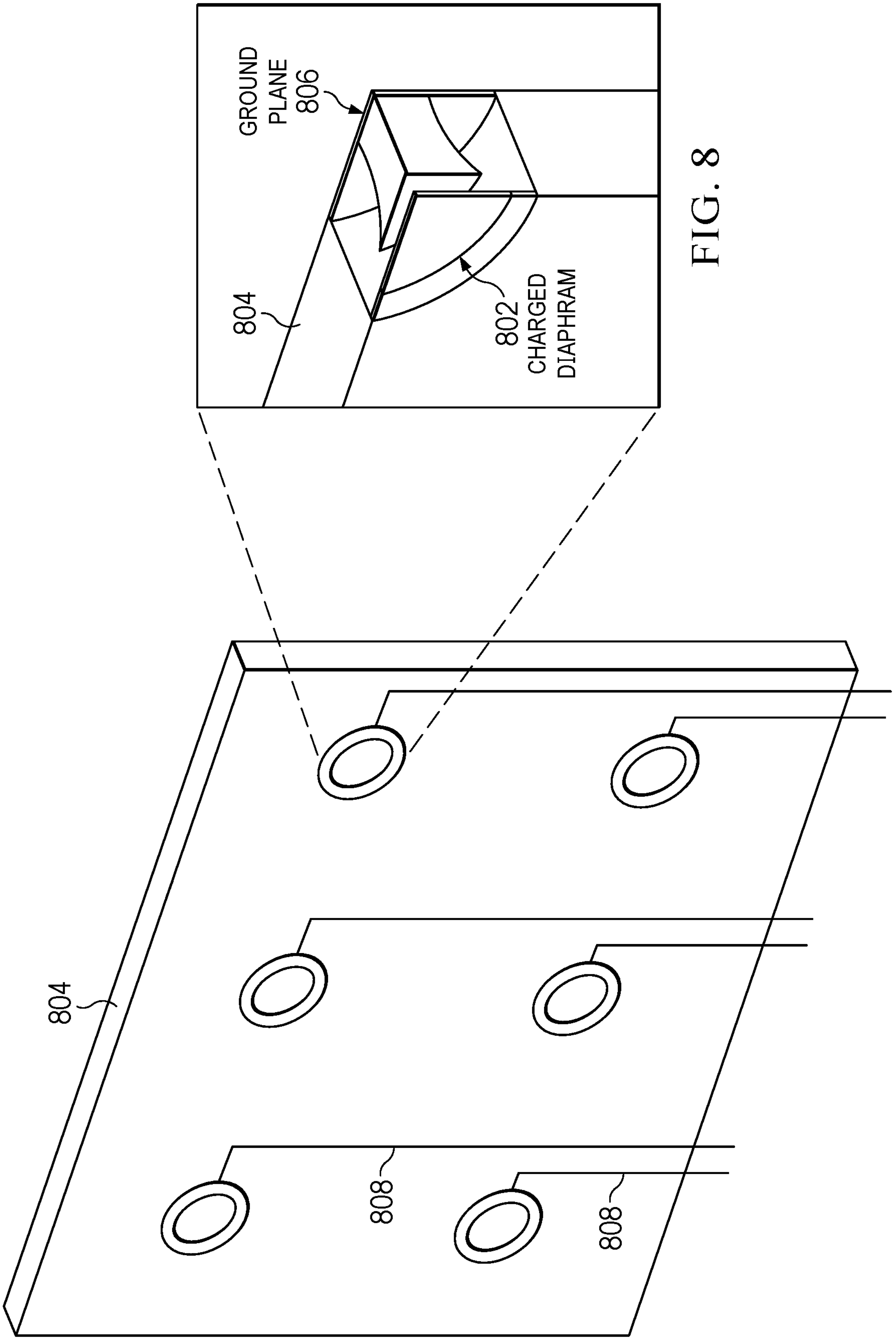
FIG. 8 illustrates an example of a microphone array composed of electret microphones and the details of the inside of an individual microphone in accordance with an illustrative embodiment.

A relatively recent development that could greatly increase the viability of a large microphone array on the interior of a large enclosure is additive manufacturing. FIG. 8 illustrates an example of a microphone array composed of electret microphones and the details of the inside of an individual microphone in accordance with an illustrative embodiment. The conductive membrane (charged diaphragm) 802 as well as the plastic material 804, ground plane 806, and wires 808 can all be created by additive manufacturing using current or emerging consumer grade 3D printing. Normally, an electret microphone employs a small field effect transistor (FET) as part of its electrical circuit. Such FETs cannot be 3D printed currently, which imposes a limit on the distance of the wires to a manifold that includes the transistors as well as an electrical source to charge the membranes. Another approach is to 3D print the plastic, wires, and cavities and then add a layer of polyvinylidene difluoride (PVDF) in place of the charged diaphragms to serve as microphones. The array shown in FIG. 8 can be manufactured to form trim panels on a jet airplane.

Figure 9:
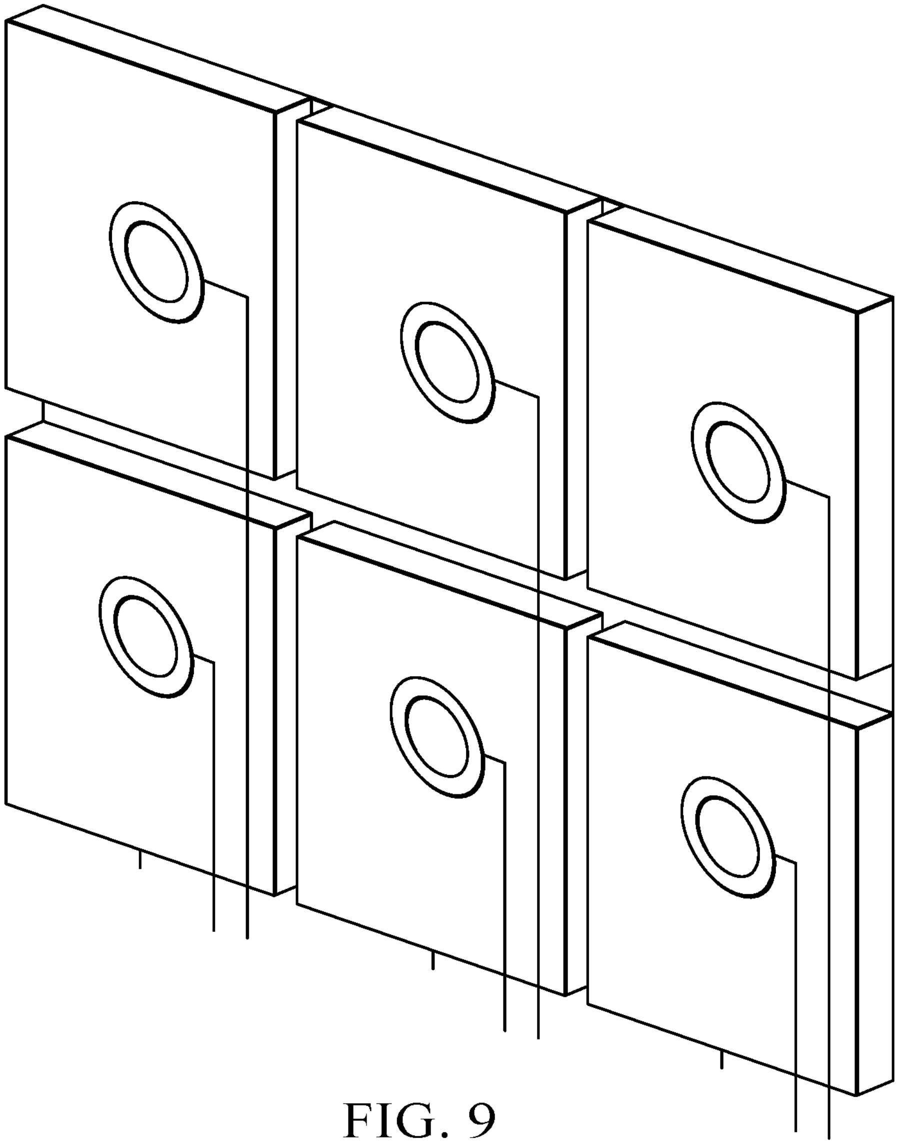
FIG. 9 illustrates an example microphone array incorporated into an aircraft trim panel in accordance with an illustrative embodiment.

FIG. 9 illustrates an example microphone array incorporated into an aircraft trim panel 900 in accordance with an illustrative embodiment. Manufacturing features into the trim panel 900 decreases the number of microphones necessary to characterize the sound. In effect, the features would convert the trim panel 900 into an array of speakers, each with a microphone to measure its response. If the sound input into the cylinder has to pass through this trim panel 900, it is reasonable to assume that these features would make it mathematically easier to accurately predict a force distribution that could cause a given pressure distribution.

The number of microphones necessary will depend both on the desired bandwidth and the number of incoherent sources, which will be determined by the nature of the flow outside the cylinder in the case of a jet.

Figure 10:
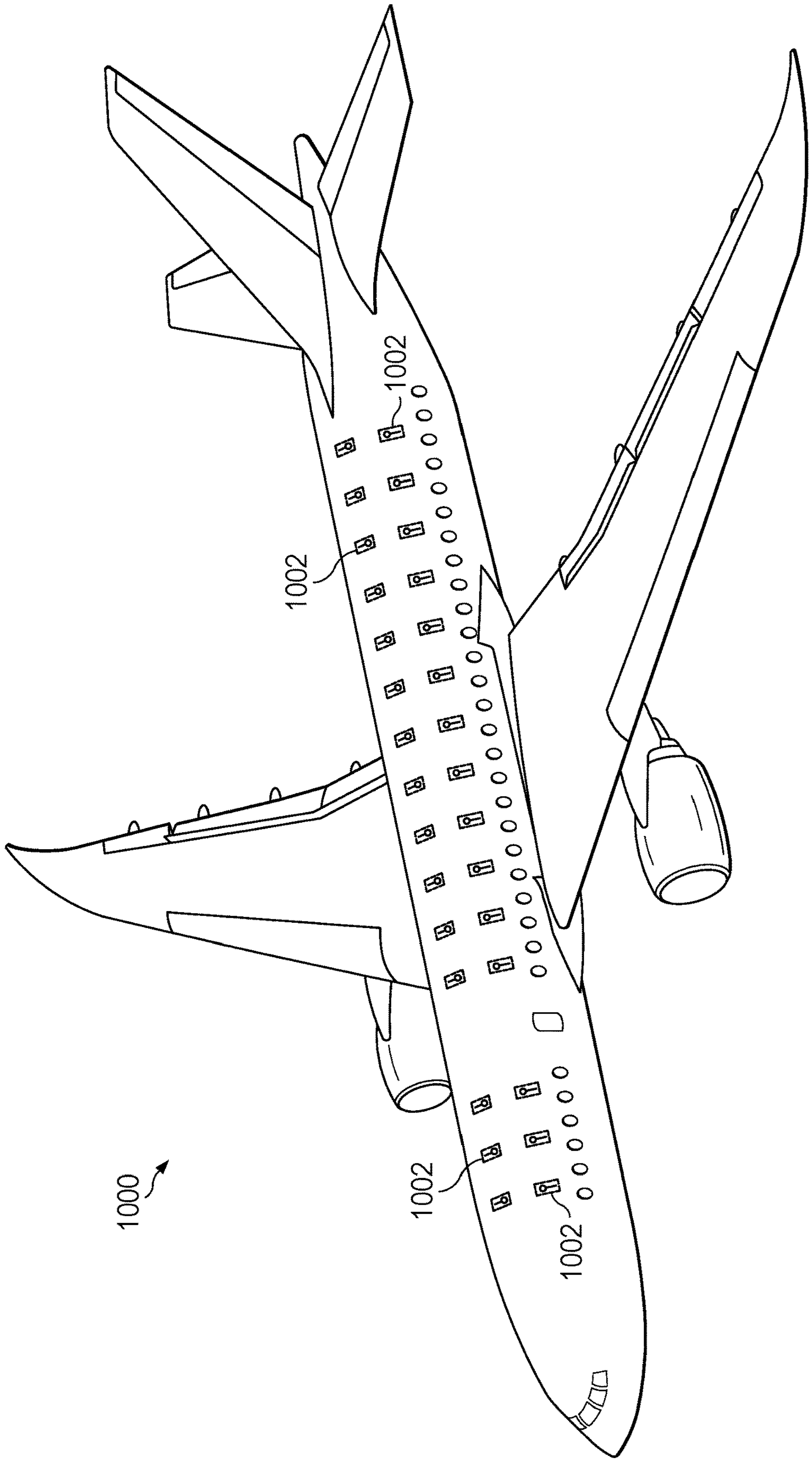
FIG. 10 depicts a diagram of a passenger jet incorporating a noise cancelling system in accordance with an illustrative embodiment.
Figure 11:
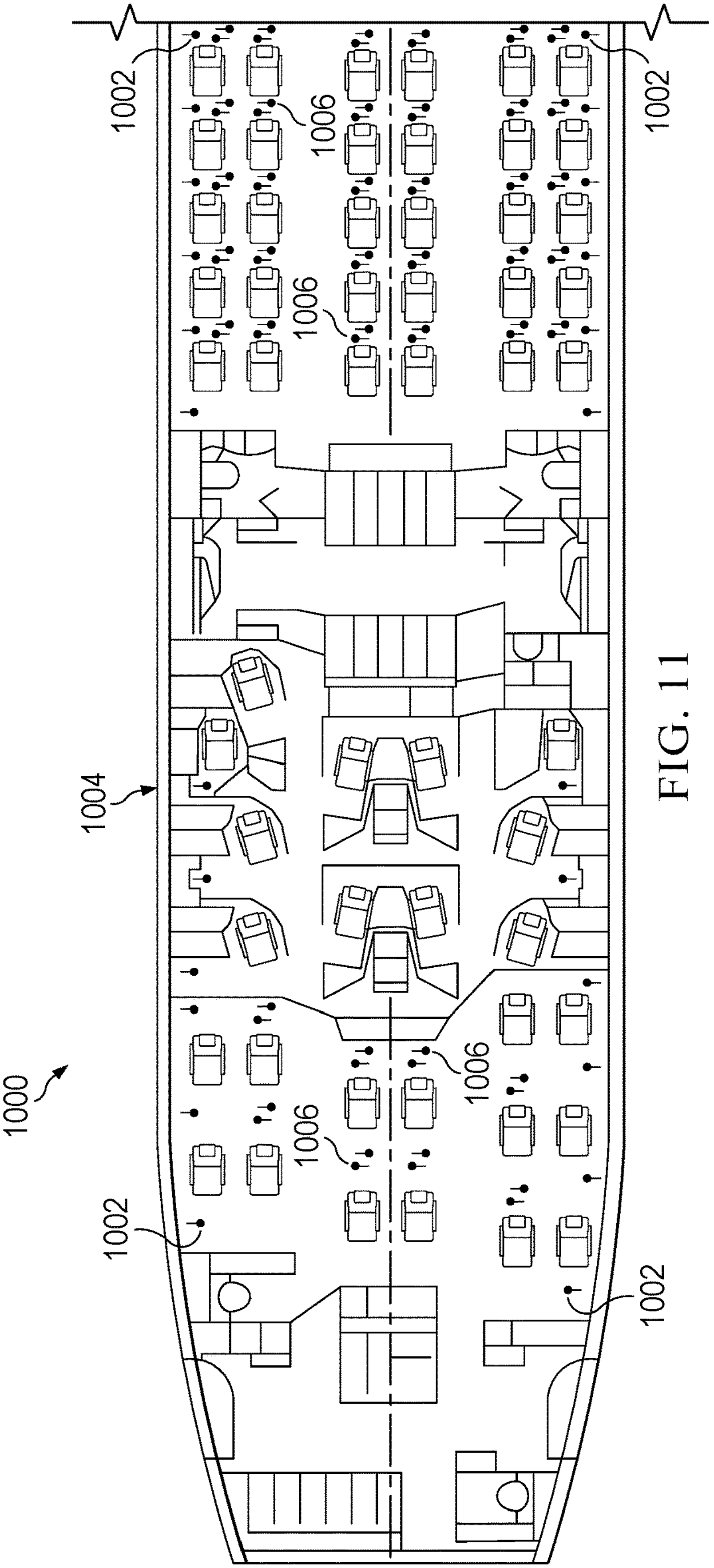
FIG. 11 depicts a top view, cross-section diagram of a passenger jet cabin incorporating a noise cancelling system in accordance with an illustrative embodiment.

FIG. 10 depicts a diagram of a passenger jet 1000 incorporating a noise cancelling system in accordance with an illustrative embodiment. FIG. 11 depicts a top view, cross-section diagram of the cabin in passenger jet 1000.

As shown in the figures, a number of microphones and/or accelerometers 1002 are incorporated along the length of the wall 1004 of the passenger cabin. The microphones/accelerometers 1002 may be mounted to the wall 1004 or may be incorporated into the trim panels such as trim panel 900 shown in FIG. 9.

A combination reference microphone/error microphone 1006 is incorporated into the headrest of each passenger seat in the cabin, providing specific noise cancellation for each passenger location.

Figure 12:
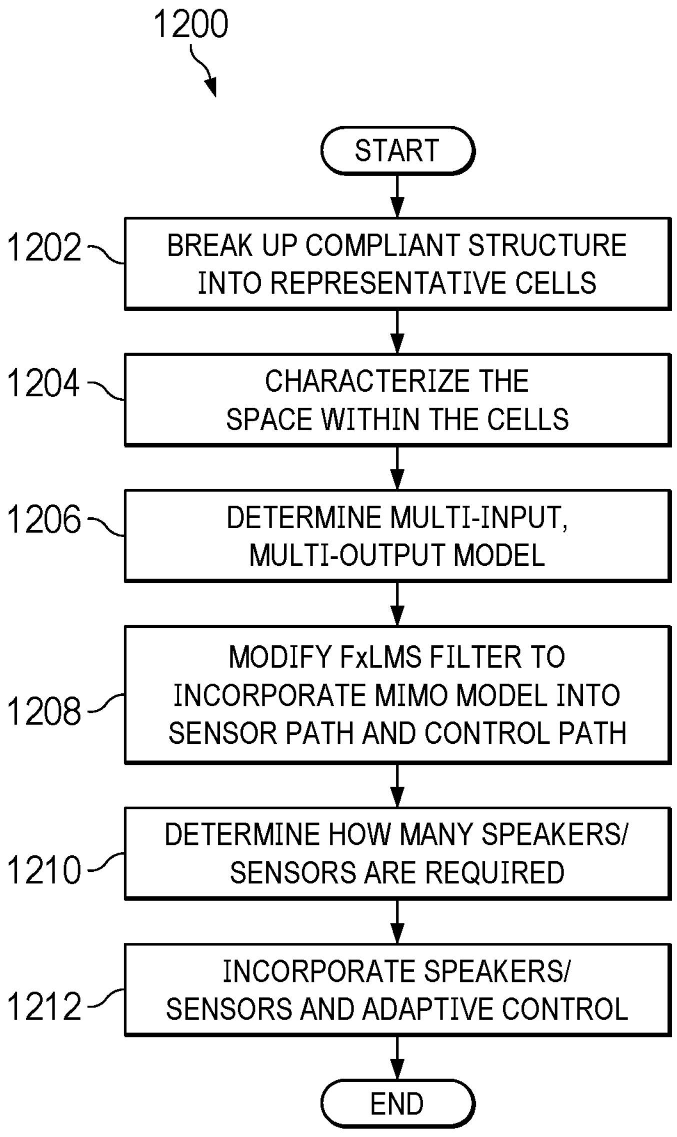
FIG. 12 depicts a flowchart illustrating a process of feedforward noise cancelation within an enclosed space in accordance with an illustrative embodiment.

FIG. 12 depicts a flowchart illustrating a process of feedforward noise cancelation within an enclosed space in accordance with an illustrative embodiment. Process 1200 provides a method to use incoherent feedforward to make the interior of a compliant structure quiet. The illustrative embodiments recognize the skin of the structure as a multifaceted sensor and actuator.

Process 1200 begins by dividing a compliant structure into a number of representative skin pockets (cells) (operation 1202). For example, the structure might be divided into 10-inch by 20-inch (10"×20") cells of composite skin. Larger or smaller cells may be used depending on the frequency range involved and the overall size of the structure.

Next, the space within the cells is characterized (operation 1204). The characterization may be performed via a modal style test with, e.g., out-of-plane hammer inputs at the center of each accelerometer to a collocated microphone/accelerometer and error/reference sensors. An omnidirectional speaker can be placed at the error sensors.

Characterization of the space may employ control speakers to error sensors, reference sensors, skin microphones, and accelerometers. Operation 1204 may start with as many speakers as pockets (two in each headrest and/or invisible speakers on the skin).

Process 1200 then fits the math model to the measured data. System identification techniques are used to determine a MIMO model for the enclosure (operation 1206). The MIMO model should be able to predict sound at the error sensor based on motion and sound of the cell.

A filtered least mean squared (FxLMS) filter is modified to incorporate the MIMO model into the sensor path and control path (operation 1208). Pocket sensors and interior sensors all function as reference sensors. The identified model of the skin should then be able to predict sound in the interior for any input combination.

The math model is then used to determine how many speakers and sensors are required for a representative disturbance by simulated feedforward in the presence of noise (operation 1210).

Based on the determination, the necessary speakers, sensors, and adaptive control are incorporated into the structure (operation 1212). Process 1200 then ends.

Figure 13:
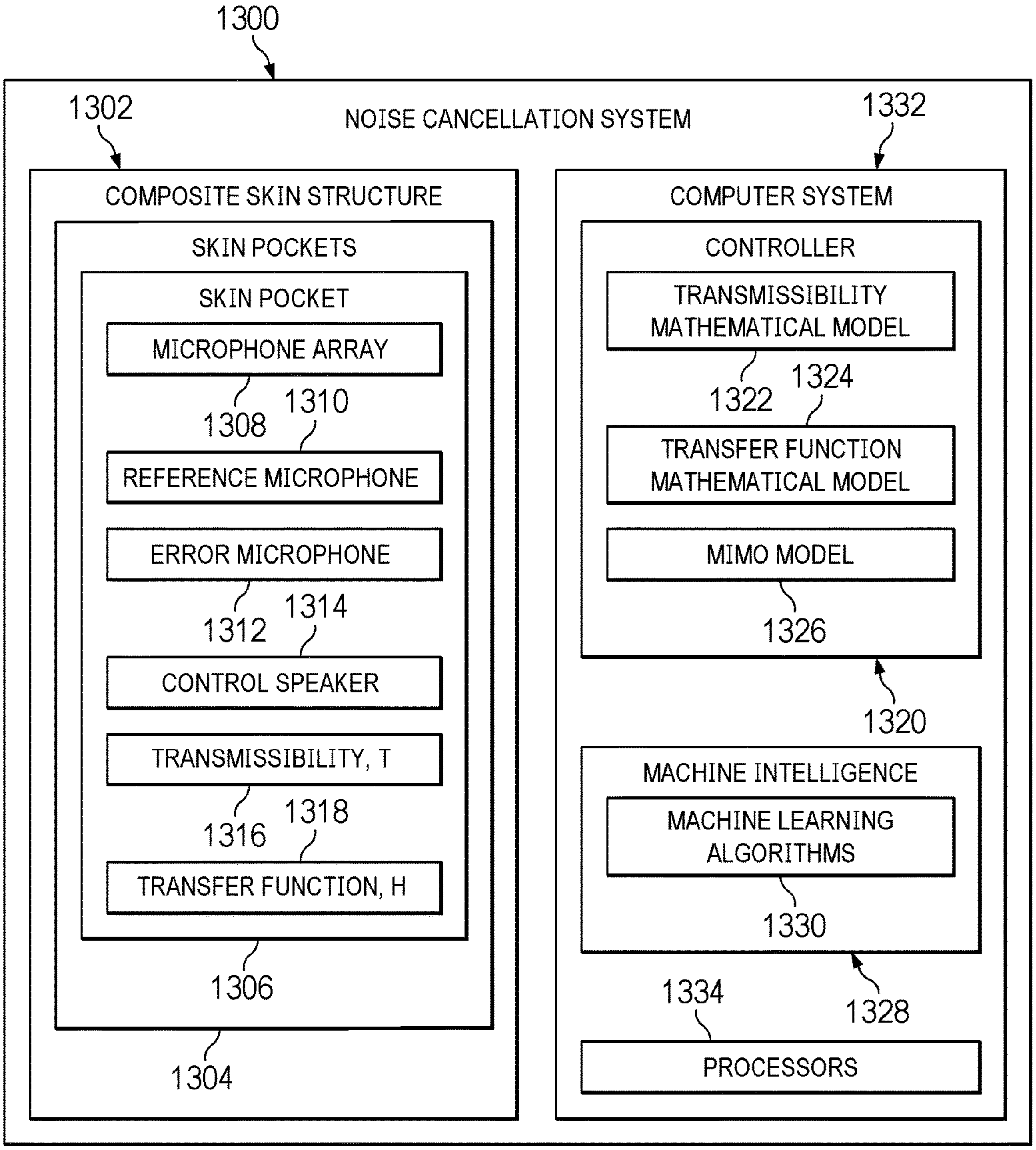
FIG. 13 depicts a block diagram illustrating a noise cancellation system in accordance with an illustrative embodiment.

FIG. 13 depicts a block diagram illustrating a noise cancellation system in accordance with an illustrative embodiment. Noise cancellation system 1300 works with a composite skin structure 1302, which can be divided into a number of cells or skin pockets 1304.

Each skin pocket 1306 comprises microphone array 1308 located just inside the skin at a number of noise input locations. With each skin pocket 1306 is a reference microphone 1310 and an error microphone 1312. At least one control speaker 1314 can be used to generate noise cancelling signals.

Skin pocket 1306 has a transmissibility 1316 between the reference microphone 1310 and the error microphone 1312, as well as transfer function 1318 between the control speaker 1314 and the error microphone 1312.

Controller 1320 provides control to control speaker 1314 according to transmissibility mathematical model 1322, transfer function mathematical model 1324, and MIMO model 1326. These models may be learned by machine intelligence 1328 employing machine learning algorithms 1330.

Controller 1320 and machine intelligence 1328 can be implemented in software, hardware, firmware, or a combination thereof. When software is used, the operations performed by controller 1320 and machine intelligence 1328 can be implemented in program code configured to run on hardware, such as a processor unit. When firmware is used, the operations performed by Controller 1320 and machine intelligence 1328 can be implemented in program code and data and stored in persistent memory to run on a processor unit. When hardware is employed, the hardware may include circuits that operate to perform the operations in controller 1320 and machine intelligence 1328.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for Controller 1320 and machine intelligence 1328 can be located in computer system 1332, which is a physical hardware system and includes one or more data processing systems. When more than one data processing system is present in computer system 1332, those data processing systems are in communication with each other using a communications medium. The communications medium can be a network. The data processing systems can be selected from at least one of a computer, a server computer, a tablet computer, or some other suitable data processing system.

For example, Controller 1320 and machine intelligence 1328 can run on one or more processors 1334 in computer system 1332. As used herein a processor is a hardware device and is comprised of hardware circuits such as those on an integrated circuit that respond and process instructions and program code that operate a computer. When processors 1334 execute instructions for a process, one or more processors can be on the same computer or on different computers in computer system 1332. In other words, the process can be distributed between processors 1334 on the same or different computers in computer system 1332. Further, one or more processors 1334 can be of the same type or different type of processors 1334. For example, one or more processors 1334 can be selected from at least one of a single core processor, a dual-core processor, a multi-processor core, a general-purpose central processing unit (CPU), a graphics processing unit (GPU), tensor processing unit, a digital signal processor (DSP), field programmable gate array (FPGA), neuromorphic processor, or some other type of processor.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for feedforward noise cancellation in an enclosed space within a structure, the method comprising:

placing a microphone array inside an inner surface of the enclosed space;

conducting modal testing on an outside surface of the enclosed space, wherein the modal testing comprises multiple incoherent noise sources corresponding to locations of microphones in the microphone array;

processing noise generated by the modal testing to create a number of acoustic mathematical models of the enclosed space; and in response to incoherent noise within the enclosed space, generating a noise canceling signal according to an output of the acoustic mathematical models.

2. The method of claim 1, wherein the acoustic mathematical models predict interior sound within the enclosed space.

3. The method of claim 1, wherein the acoustic mathematical models are derived via machine learning algorithms.

4. The method of claim 1, further comprising accelerometers within the structure for modal testing.

5. The method of claim 1, further comprising piezoelectric wafers within the structure for modal testing.

6. The method of claim 1, placing a reference microphone within the enclosed space.

7. The method of claim 1, placing an error microphone within the enclosed space.

8. The method of claim 1, wherein the noise canceling signal is generated by a control speaker.

9. The method of claim 1, wherein the acoustic mathematical models are formulated with system identification techniques.

10. The method of claim 1, wherein the microphone array is created via additive manufacturing.

11. The method of claim 1, wherein the microphone array comprises electret microphones.

12. The method of claim 1, wherein the microphone array comprises PVDF microphones.

13. A noise cancellation system for an enclosed space within a structure, wherein the noise cancellation system comprises:

a microphone array inside an inner surface of the enclosed space;

a reference microphone within the enclosed space;

an error microphone within the enclosed space;

a control speaker configured to generate a noise canceling signal in response to incoherent noise within the enclosed space; and a controller configured to control the control speaker based upon a number of acoustic mathematical models based on modal tests on an outside surface of the enclosed space, wherein the modal tests comprise multiple incoherent noise sources corresponding to locations of microphones in the microphone array.

14. The noise cancellation system of claim 13, wherein the number of acoustic mathematical models based are further based upon a machine learning algorithm.

15. The noise cancellation system of claim 13, further comprising accelerometers within the structure for modal tests.

16. The noise cancellation system of claim 13, further comprising piezoelectric wafers within the structure for modal tests.

17. The noise cancellation system of claim 13, wherein the microphone array comprises electret microphones.

18. The noise cancellation system of claim 13, wherein the microphone array comprises PVDF microphones.

19. A method for feedforward noise cancellation in an enclosed space within a structure, the method comprising:

placing a microphone array inside an inner surface of the enclosed space;

conducting modal testing on an outside surface of the enclosed space, wherein the modal testing comprises multiple incoherent noise sources corresponding to locations of microphones in the microphone array;

processing noise generated by the modal testing to create a first number of acoustic mathematical models of the enclosed space;

placing an accelerometer array on an outer or inner surface of the structure;

generating sound with an omnidirectional speaker inside the enclosed space;

testing the structure via the accelerometer array via accelerations on the structure produced by the sound from the omnidirectional speaker;

processing the accelerations generated by the testing to create a second number of acoustic mathematical models of the enclosed space; and in response to incoherent noise within the enclosed space, a control speaker generating a noise canceling signal according to an output of the acoustic mathematical models.

20. A feedforward noise cancellation system for an enclosed space within a structure, wherein the feedforward noise cancellation system comprises:

a microphone array inside an inner surface of the enclosed space;

a reference microphone within the enclosed space;

an error microphone within the enclosed space;

an accelerometer array on an outer or inner surface of the structure;

an omnidirectional speaker within the enclosed space;

a control speaker configured to generate a noise canceling signal in response to incoherent noise within the enclosed space; and a controller configured to control the omnidirectional speaker and the control speaker based upon a number of acoustic mathematical models based on modal tests on an outside surface of the enclosed space, wherein the modal tests comprise multiple incoherent noise sources corresponding to locations of microphones in the microphone array.

* * * * *